Aug. 11, 1959 G. N. TSIGULOFF 2,898,926
SAFETY DISCONNECT VALVE
Filed Nov. 14, 1955 2 Sheets-Sheet 1

INVENTOR.
GEORGE N. TSIGULOFF
BY
ATTORNEY

Aug. 11, 1959     G. N. TSIGULOFF     2,898,926
SAFETY DISCONNECT VALVE

Filed Nov. 14, 1955     2 Sheets-Sheet 2

INVENTOR.
GEORGE N. TSIGULOFF
BY
*Edmund W. E. Kamm*
ATTORNEY

United States Patent Office 2,898,926
Patented Aug. 11, 1959

2,898,926
SAFETY DISCONNECT VALVE

George N. Tsiguloff, Fort Wayne, Ind., assignor to Tokheim Corporation, Fort Wayne, Ind., a corporation of Indiana Application November 14, 1955, Serial No. 546,555

14 Claims. (Cl. 137—68)

This invention relates to a safety disconnect valve. More specifically it relates to a valve of the type described which is particularly adapted for use with a gasoline dispensing system particularly one which employs a pump located at a station remote from one or more dispensing pedestals.

In such a system, the pipes leading to all of the pedestals contain hazardous liquid which is under pressure at any time that any pedestal connected to the system is being operated. Thus if any one of the non-operated pedestals accidentally suffers a collision impact severe enough to break the discharge pipe leading thereto, the liquid will gush from the pipe serving that pedestal and a serious fire hazard would be created, quantities of a relatively expensive liquid will be lost and the system will be rendered unfit for further operation. The operator, who may be at a point remote from the damaged pedestal, might not even be aware of the accident and accordingly might permit the system to continue operating so that the liquid would continue to flow and thus increase the hazard and the loss of expensive liquid.

It is an object of the invention to provide a mechanism located at the inlet of each pedestal which will prevent the flow of liquid from a severed delivery pipe.

Another object of the invention is to provide a valve mechanism having a weakened section which will break under impact and free the valve housing for closing.

Still another object of the invention is to provide a valve mechanism which will close in the event the pedestal suffers an impact from any horizontal direction.

A further object is to provide a valve which is held open against the flow of liquid so that the flow will assist closure in the event of a breakage of the line.

Yet another object of the invention is to provide means for automatically closing an outlet which has been broken so that service from the rest of the outlets of the system may be continued.

Figure 1:
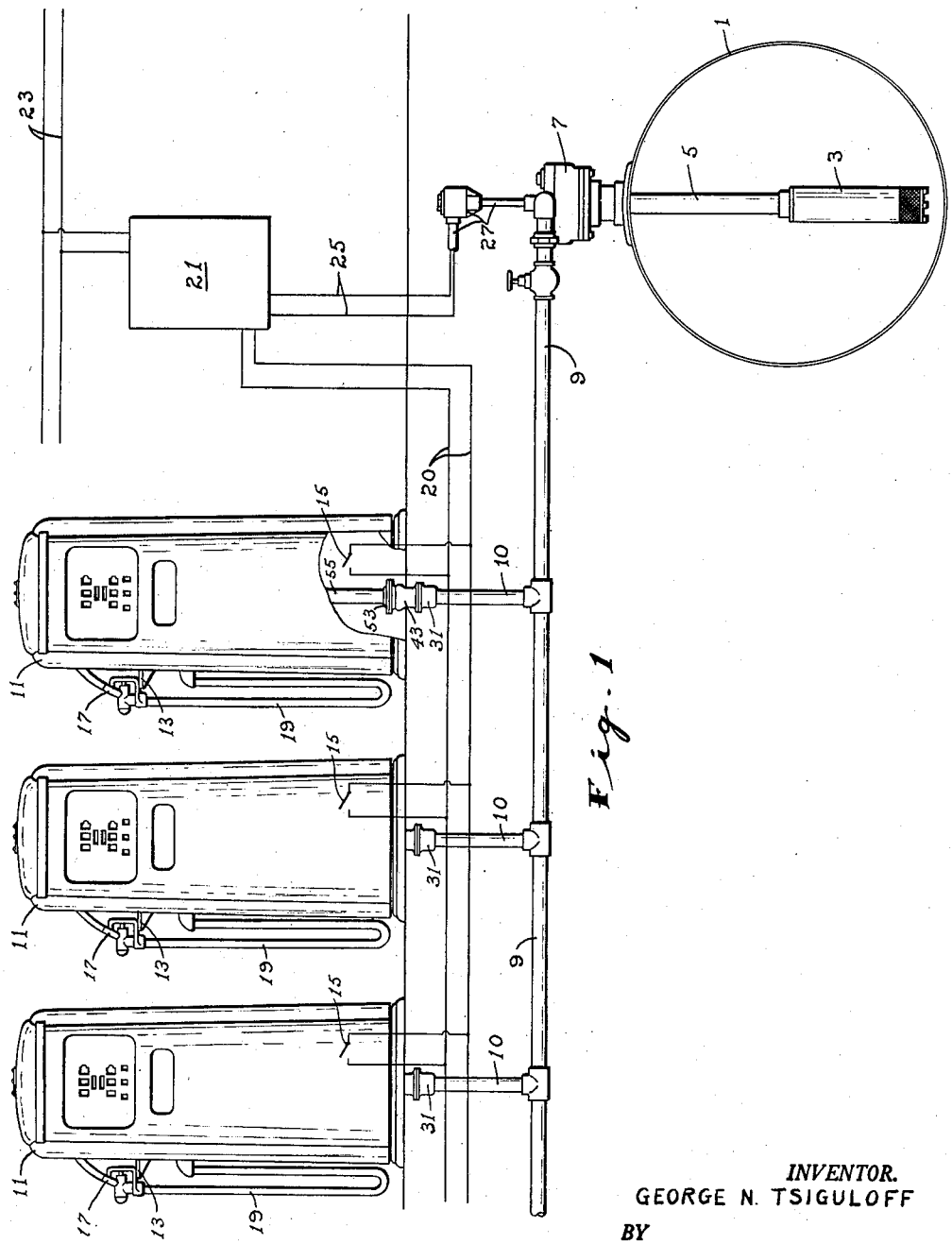
Figure 2:
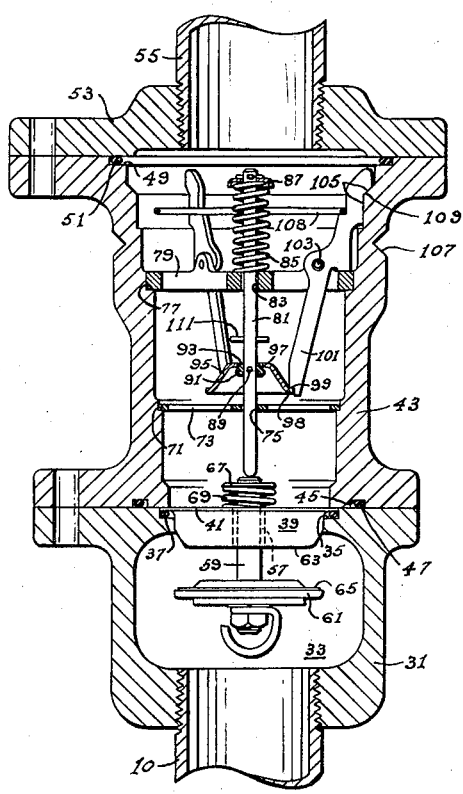
Figure 3:
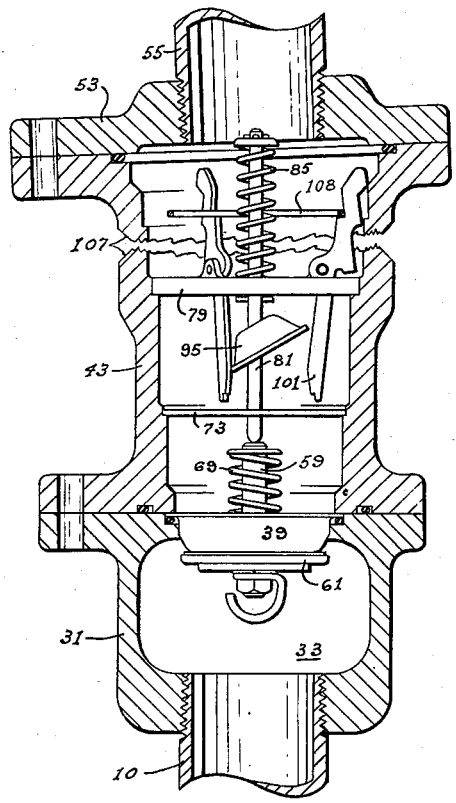
Figure 4:
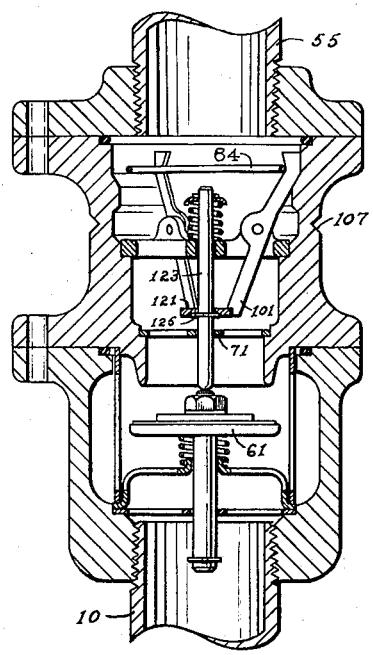

These and other objects will become apparent from a study of this application, and the drawings which are attached hereto, made a part hereof and in which Figure 1 is a schematic view of the dispensing system, Figure 2 is a longitudinal, sectional view of the valve shown in the open condition, Figure 3 is a view of the mechanism of Figure 2 but showing the valve in the closed position, Figure 4 is a view of a modified form of the valve having a washer type of collar.

Preferred form
(Figures 1 to 3)

Referring first to Figure 1, the numeral 1 represents a storage tank for gasoline or other liquid in which is disposed a submerged pump-motor unit 3 which is connected by discharge pipe 5, through header 7 to the delivery pipe 9 which has various branches or discharge stubs 10, each of which is connected to a pedestal 11. The latter comprises the usual meter, computer, reset and interlock mechanism, hose hook 13, switch 15 which is operated by the hose hook under control of the interlock mechanism. A valved nozzle 17 is adapted to be supported on the hook when the latter is in the power-off position and cannot be supported on the hook when the latter is in the power-on position. The nozzle is connected to the meter by a hose 19 and other piping. The structure of the pedestal may be like that shown in application Serial Number 186,815 for Liquid Fuel Dispensing Apparatus filed September 26th, 1950, now Patent Number 2,732,103 issued January 24, 1956.

The switches 15 of the various pedestals are preferably connected in parallel by wires 20 to the starter 21 which is connected to the main 23 and to the motor of the pump by wires 25 which enter the motor through the conduit 27. The movement of any one of the hose hooks to power-on position will close a switch 15, energize the starter and start the pump motor in a well known manner.

It should be understood that the motor-pump unit need not be a submerged type of unit but may be of the submerged pump-above tank motor or both elements of the unit may be disposed outside of the tank. The main distinguishing feature of the system under discussion is that the motor-pump unit is located remotely from the pedestal or pedestals.

Each outlet or valve stub 10 is connected to a valve body 31 which defines a valve chamber 33. The body is provided with a recess 35 in which is seated an O-ring gasket 37 and a valve ring 39 has a radial flange 41 which rests on the O-ring and is held in place by the housing 43. The latter has a groove 45 which contains an O-ring seal 47 for sealing the joint between the body and housing.

The other end of the housing has a recess 49 which receives an O-ring 51 for sealing the joint between the housing and a cap 53. A pipe 55 enters the cap and serves as the inlet pipe to the pedestal.

The valve ring 39 is provided with a guide 57 for supporting and guiding the stem 59 of the poppet valve 61. The ring is provided with a seat 63 which cooperates with the seat 65 of the valve. A spring seat 67 is suitably mounted on the end of the stem to compress a spring 69 between it and the guide 57. The parts forming the ring and valve are preferably formed as an integral assembly which is removable as a unit from the body.

Trip mechanism

A recess 71 is formed in the housing to receive a tappet guide 73 which has a central opening 75. A second, recess 77 is formed in the housing downstream of the first mentioned recess to receive a pawl support and tappet guide 79. A tappet rod 81 is mounted in the central opening 83 of guide 79 and in opening 75 and is adapted to contact the end of the stem 59. Both guides have liquid passages formed therein to minimize the impedance to flow of liquid therethrough.

A spring 85 is compressed between the guide 79 and a spring seat 87 which is suitably attached to the end of the tappet and tends to draw the tappet away from the valve stem.

Pinned to the tappet at 89 between guides 73 and 79 is a stop 91 having preferably a spherical bearing face 93. A dished collar 95 has a central opening which defines an edge 97 adapted to ride on the face of the stop so that the collar may tilt in any direction on the bearing. The collar has a peripheral, substantially radially directed flange 98 which is adapted for engagement by the notched ends 99 of three pawls 101 which are pivotally mounted on pins 103 on the ring 79 for movement in planes which substantially intersect the central axis of the tappet rod and which are preferably spaced one hundred twenty degrees apart.

The other end of each pawl which projects beyond the pivot pin serves as a trigger for the trip mechanism and is formed at 105 to lie against the housing 43 above the V-notch 107 which encircles the exterior of the housing. The notch provides a weak cross-section so that if the housing is broken due to impact etc., the break will occur at the notch. A ring 108 of light, soft wire may be used to hold the pawls in place on the collar against ordinary jars and vibration.

Usually under such circumstances, the cap 53 and the portion of the housing which is attached thereto will either shift laterally, lift, twist or move with some combinations of these motions. In all cases at least one of the pawls will have its trigger end displaced inwardly toward the control axis of the tappet, the ring 108 yielding as this occurs. To facilitate such motion the end portion of the pawl may be formed to extend outwardly over a cam surface 109 on the housing. When any pawl is rotated as indicated, the notched end will trip or release the collar 95 which will tilt and allow the tappet rod 81 to be withdrawn from the valve stem by its spring 85 whereupon the valve spring 69 will become effective to close the valve as shown in Figure 3.

A pin 111 may be provided in the tappet rod to limit movement of the collar along the rod and also to limit the movement of the tappet rod toward the ring 79 under action of the spring 85.

*Operation*

Assuming that the system is in the inoperative condition and that a delivery is to be made from a selected pedestal, the operator will remove the nozzle 17 from the hose hook 13 and move the latter to its power-on position to close the associated switch 15. This energizes the starter 21 through lines 20 and the starter energizes the motor-pump unit 3.

Liquid under pressure passes from the pump through pipe 5, header 7, line 9, suction stub 10, valve body 31, the valve, housing 43, cap 53 and pipe 55 to the pedestal and through the hose and nozzle into the customer's tank.

Should any one of the pedestals suffer an impact which is sufficient to break the housing 43 at the notch 107, the valve 61 will close automatically as described above and prevent continuation of the flow of liquid through the damaged outlet. Thus loss of the expensive liquid is minimized as is the fire hazard and in addition the remainder of the pedestals in the system may be operated during the period before the damaged unit is replaced or repaired.

It is of course necessary to replace the housing 43 which was broken but the remainder of the parts can be installed in a new housing, the valve trip mechanism can be reset and thereafter the housing can be assembled with cap 53 and body 31 to restore the system to its former condition with all of its outlets in service.

*Modified form*

(Figure 4)

The modified form of Figure 4 discloses three pawls 101 which act on a plain washer 121 which is supported against movement on the tappet toward the valve by a snap ring 125 which engages a groove in the tappet. The hole in the washer has a greater diameter than the tappet so that it may tilt when any one of the pawls is disengaged and thus renders the remaining pawls ineffective to hold the valve open.

A readily yieldable ring 84 is installed in contact with the trigger ends of the pawls to prevent accidental disengagement of the pawls from the washer by vibration or ordinary shocks.

The action is generally the same as that described above in that the fracture of the body will trip the pawl and collar device so that the valve 61 may close.

It is obvious that various changes may be made in the form, structure and arrangement of parts of the specific embodiments of the invention disclosed herein for purposes of illustration, without departing from the spirit of the invention. Accordingly, applicant does not desire to be limited to such specific embodiments but desires protection falling fairly within the scope of the appended claims.

I claim:

1. A safety disconnect valve which comprises a valve body, said body defining a passage having an inlet and an outlet, said body having a weak section located between said inlet and said outlet, a valve mounted on said body, between said inlet and said weak section, for movement to and from a position for closing said passage, means, including a latching mechanism for holding said valve open, means on said latching mechanism, operable by relative movement of the parts of the body at said weak section, for disabling said holding means so that the valve will close, wherein the holding means comprises a tappet having pressure contact with said valve, said tappet being mounted for movement to open said valve, latch pawl means pivotally supported on said body on one side of the weak section and having an arm means extending into contact with the body on the other side of said weak section, stop means on said tappet arranged for engagement by the other end of said pawl means, said pawl and stop means when engaged serving to hold valve open, relative movement of said body parts on opposite sides of said weak section serving to disengage said pawl and stop means to release said tappet and valve for closure of the valve.

2. A safety disconnect valve which comprises a valve body, said body defining a passage having an inlet and an outlet, said body having a weak section located between said inlet and said outlet, a valve mounted on said body, between said inlet and said weak section, for movement to and from a position for closing said passage, means, including a latching mechanism for holding said valve open, means on said latching mechanism, operable by relative movement of the parts of the body at said weak section, for disabling said holding means so that the valve will close, wherein the holding means comprises a tappet having pressure contact with said valve, said tappet being mounted for movement to open said valve, yieldable means acting on said tappet in a direction to withdraw it from the valve, latch pawl means pivotally supported on said body on one side of the weak section and having an arm means extending into contact with the body on the other side of said weak section, stop means on said tappet arranged for engagement by the other end of said pawl means, said pawl and stop means when engaged serving to hold said valve open, relative movement of said body parts on opposite sides of said weak section serving to disengage said pawl and stop means to release said tappet and valve for closure of the valve.

3. A safety disconnect valve which comprises a valve body, said body defining a passage having an inlet and an outlet, said body having a weak section located between said inlet and said outlet, a valve mounted on said body, between said inlet and said weak section, for movement to and from a position for closing said passage, means, including a latching mechanism for holding said valve open, means on said latching mechanism, operable by relative movement of the parts of the body at said weak section, for disabling said holding means so that the valve will close, wherein the holding means comprises a tappet having pressure contact with said valve, said tappet being mounted for movement to open said valve, latch pawl means pivotally supported on said body on one side of the weak section, for rotation in a plane which includes the axis of the tappet and having an arm means extending into contact with the body on the other side of said weak section, stop means on said tappet arranged for engagement by the other end of said pawl means, said pawl and stop means when engaged serving to hold said valve open, relative movement of said body parts on opposite sides of said weak section serving to disengage said pawl and stop to release said tappet and valve for closure of the valve.

4. A safety disconnect valve comprising a valve body defining a passage having an inlet and an outlet, a self closing valve mounted on the body, upstream of said outlet, to close the passage, a trip mechanism including a latch pawl which is mounted on the body and for movement to set and tripped conditions, said latch pawl in the set condition serving to hold the valve open and in the tripped condition serving to permit the valve to close, said body having a weak section located between the valve and said outlet to localize severance of the body under undue stress, said trip mechanism including means disposed for actuation by the relative movement of parts of said body at said weak section for moving said latch pawl relative to each of said parts of said body to the tripped condition of said latch pawl.

5. A safety disconnect valve comprising a substantially cylindrical valve body having an inlet, an outlet and a self closing, poppet type valve mounted coaxially therein to close the body between the inlet and outlet, a trip mechanism mounted in the body comprising a tappet mounted for reciprocation in the body to hold said valve stem in valve open position and to free the valve for closing, collar means on the tappet, latch means supported by the body having set and tripped conditions and including latch and trigger portions adapted to engage the collar means and the body respectively, when in set condition, said body having a weak section located between said valve stem and the trigger portion so that relative movement of the parts of said body at said weak section will actuate the latch means to tripped condition freeing the tappet and the valve for closure.

6. The structure defined by claim 5 wherein yieldable means are provided for urging the tappet away from the valve stem.

7. The structure defined by claim 5 wherein the collar means includes a rim and is tiltably mounted on the tappet, and the latch means includes at least three circumferentially spaced pawls each having a latch portion for engaging the rim of the collar so that the actuation of any pawl will permit the collar to tilt and free itself from the remaining pawls.

8. The structure defined by claim 5 wherein the portion of the body contacted by the latching means is provided with cam means and the trigger portion conforms to said cam means to insure that relative displacement of the parts of the body at said weak section in a substantially axial direction will trip said latching means.

9. The structure defined by claim 5 wherein the collar means includes a rim and is tiltably mounted on the tappet, and the latch means includes at least three circumferentially spaced pawls each having a latch portion for engaging the rim of the collar so that the actuation of any pawl will permit the collar to tilt and free itself from the remaining pawls and wherein yieldable means are provided for urging the tappet away from the valve stem.

10. A safety disconnect valve comprising a substantially cylindrical valve body having an inlet, an outlet and a self closing poppet type valve mounted therein to close the body between the inlet and outlet, a tappet, means for mounting said tappet for reciprocation to and from contact with said valve and having a set position in which it holds the valve open and a tripped position in which it is out of contact with the valve, said body having a circumferential groove between the valve and the outlet of the body to provide a weak section, a collar mounted for universal tilting motion on the tappet, a ring mounted in the body between the groove and the valve, at least three, circumferentially spaced pawls pivotally mounted on the ring, each pawl having a latch end for engagement with the collar and a trigger portion disposed to engage the body between the groove and the outlet of the body that relative movement of the portions of the body at said groove will move the latch end of at least one pawl out of engagement with the collar so that subsequent tilting thereof will free it from the remaining pawls to free the tappet and valve for closing.

11. The structure defined by claim 10 in which the pawls are equally spaced circumferentially.

12. The structure defined by claim 5 wherein yieldable means engages the latch means to resist actuation of the latch means to tripped position.

13. The structure defined by claim 10 wherein a yieldable member is disposed in contact with the pawls in a direction to resist the movement thereof out of engagement with the collar.

14. The structure defined by claim 10 wherein a yieldable ring is disposed within the latch ends of said pawls to resist the inward movement thereof.

References Cited in the file of this patent

UNITED STATES PATENTS

| 2,048,388 | Johnsen | July 21, 1936 |
| 2,054,561 | Greenberg | Sept. 15, 1936 |
| 2,768,695 | Althouse | Oct. 30, 1956 |